United States Patent [19]
Dresser et al.

[11] Patent Number: 5,446,860
[45] Date of Patent: Aug. 29, 1995

[54] APPARATUS FOR DETERMINING A COMPUTER MEMORY CONFIGURATION OF MEMORY MODULES USING PRESENCE DETECT BITS SHIFTED SERIALLY INTO A CONFIGURATION REGISTER

[75] Inventors: Scott A. Dresser, Mountain View, Calif.; Scott A. Markinson, Goffstown, N.H.; Richard B. Goud, Concord, Mass.

[73] Assignee: Hewlett-Packard Company, Palo Alto, Calif.

[21] Appl. No.: 3,194

[22] Filed: Jan. 11, 1993

[51] Int. Cl.⁶ .............................................. G06F 13/00
[52] U.S. Cl. .............................. 395/427; 364/DIG. 1; 364/244.2; 364/244.5; 364/243; 364/DIG. 2; 364/246.7; 364/969.1; 364/245
[58] Field of Search ...................................... 395/425; 364/200 MS File, 400 MS File, 245, 246.7, 969.1, 244.2, 244.5, 243

[56] References Cited

U.S. PATENT DOCUMENTS

| | | | |
|---|---|---|---|
| 3,958,222 | 5/1976 | Messina et al. | 395/425 |
| 4,234,934 | 11/1980 | Thorsrud | 395/400 |
| 4,414,627 | 11/1983 | Nakamura | 395/400 |
| 4,562,532 | 12/1985 | Nishizawa et al. | 395/425 |
| 4,571,676 | 2/1986 | Mantellina et al. | 395/425 |
| 4,654,787 | 3/1987 | Finnell et al. | 395/425 |
| 4,794,559 | 12/1988 | Greenburger | 365/49 |
| 4,882,700 | 11/1989 | Mauritz et al. | 365/51 |
| 5,040,153 | 8/1991 | Fung et al. | 365/230.03 |
| 5,179,686 | 1/1993 | White | 395/425 |
| 5,269,010 | 12/1993 | MacDonald | 395/425 |
| 5,270,964 | 12/1993 | Bechtolsteim et al. | 365/52 |

FOREIGN PATENT DOCUMENTS 0440445  8/1991  European Pat. Off. .

OTHER PUBLICATIONS

"Memory Presence Detect", IBM Technical Disclosure Bulletin, vol. 29, No. 3, Aug. 1986, p. 1381.

*Primary Examiner*—Glenn Gossage
*Assistant Examiner*—Frank J. Asta

[57] ABSTRACT

An apparatus is provided for determining a configuration of memory modules. Each of the memory modules produces presence detect bits. In a first feature, the apparatus includes an external register for receiving the presence detect bits from the memory modules in parallel and a memory controller integrated circuit. The memory controller integrated circuit includes an internal register for storing the presence detect bits and logic circuitry for determining a memory configuration. The presence detect bits are serially transferred from the external register to the internal register. In a second feature, the logic circuitry for determining a memory configuration includes comparator circuitry for comparing the presence detect bits of each pair of memory modules and generating a match signal or a mismatch signal. When a match signal occurs, the presence detect bits of the memory module pair are loaded into a memory configuration register. When a mismatch signal occurs, a mismatch code is loaded into the memory configuration register.

16 Claims, 4 Drawing Sheets

APPARATUS FOR DETERMINING A COMPUTER MEMORY CONFIGURATION OF MEMORY MODULES USING PRESENCE DETECT BITS SHIFTED SERIALLY INTO A CONFIGURATION REGISTER

FIELD OF THE INVENTION

This invention relates to techniques for controlling computer memories and, more particularly, to an apparatus for automatically determining the configuration of a user-configurable computer memory.

BACKGROUND OF THE INVENTION

The requirements of a computer memory vary widely as to capacity, speed, data bus width, and the like, depending on the application of the computer. It has been customary for manufacturers of general purpose computers to provide modular memory subsystems. The memory subsystem includes a number of slots, or connectors, for memory modules. Memory modules may be mounted in some or all of the slots, depending on the application. The memory modules may vary as to capacity, operating speed, data bus width, etc.

A typical computer utilizes a memory controller for converting a memory address supplied by the CPU into the required address and control signals for accessing a particular memory location. The typical memory controller generates row address strobe, column address strobe and write enable signals. The memory controller is typically implemented in one or more large scale integrated circuits. When the memory is modular, the memory controller and the CPU must receive information which defines the memory configuration in order to supply the required address and control signals to the memory modules that are present in the system. It is thus customary that each memory module provides a number of presence detect codes, or presence detect bits, at its connector. The presence detect bits include information as to the memory module capacity, DRAM device speed, etc. A memory configuration is determined from the presence detect bits. An example of a memory module that provides presence detect bits is a single in-line memory module (SIMM).

A large number of presence detect bits must be handled by the memory controller. A typical memory subsystem may include up to 8 memory modules, each of which generates 6 presence detect bits, totaling 48 presence detect bits. This information must be input to the memory controller integrated circuit, where the number of I/O pins is limited. In prior art systems, presence detect bits have typically been latched in parallel because they are available in parallel from the memory modules.

In existing memory subsystems, memory modules may be utilized in pairs to achieve a wide data bus. For example, many computer systems require a 64 bit memory data bus, whereas standard memory modules are available with a 32 bit data bus. It is thus necessary that the memory modules be installed in pairs to achieve the 64 bit data bus. In this case, the memory modules of each pair must be identical. The computer system must be capable of determining when a user inadvertently installs different memory modules as a pair. In prior art systems, determining memory module pair mismatches has been performed by the system software. This approach has the disadvantages of requiring software intervention, which takes time, and requiring a larger number of registers in the system software in order to identify memory module mismatches.

SUMMARY OF THE INVENTION

In accordance with the present invention, apparatus is provided for determining a memory configuration of memory modules for use in controlling the memory modules. Each of the memory modules produces presence detect bits. The apparatus comprises an external register for receiving and storing the presence detect bits from each of the memory modules, and a memory controller integrated circuit for controlling the memory modules. The memory controller integrated circuit includes an internal register for storing the presence detect bits. The apparatus further comprises means for serially transferring the presence detect bits from the external register to the internal register and logic means within the memory controller integrated circuit for determining a memory configuration in response to the presence detect bits. The means for serially transferring the presence detect bits preferably includes a single data line and a single clock line on the memory controller integrated circuit. In a preferred embodiment, the memory modules, the external register and the memory controller integrated circuit are mounted on a single circuit board.

The logic means for determining a memory configuration preferably comprises a memory configuration register, comparison means for comparing the presence detect bits of memory module pairs and selector means responsive to the comparison means for loading the presence detect bits of the memory module pairs into the memory configuration register when the comparison means indicates that the presence detect bits of the memory module pairs match and for loading a mismatch code into the memory configuration register when the comparison means indicates that the presence detect bits of the memory module pairs do not match. The comparison means preferably includes a comparator for each pair of memory modules. The selector means preferably includes a data selector for each pair of memory modules.

According to another aspect of the invention, an apparatus is provided for determining a memory configuration of one or more pairs of memory modules. The memory configuration is used in controlling the memory modules. Each of the memory modules produces presence detect bits. The apparatus comprises a register for receiving presence detect bits produced by each of the memory modules and for storing the presence detect bits, a memory configuration register, comparison means for comparing the presence detect bits of each pair of memory modules and generating a match signal or a mismatch signal, and selector means responsive to the match signal for loading the presence detect bits of the corresponding pair of memory modules into the memory configuration register and responsive to the mismatch signal for loading a mismatch code into the memory configuration register. The register, the memory configuration register, the comparison means and the selector means are preferably located within a memory controller integrated circuit.

BRIEF DESCRIPTION OF THE DRAWINGS

For a better understanding of the present invention, reference is made to the accompanying drawings, which are incorporated herein by reference and in which.

DETAILED DESCRIPTION OF THE INVENTION

Figure 1:
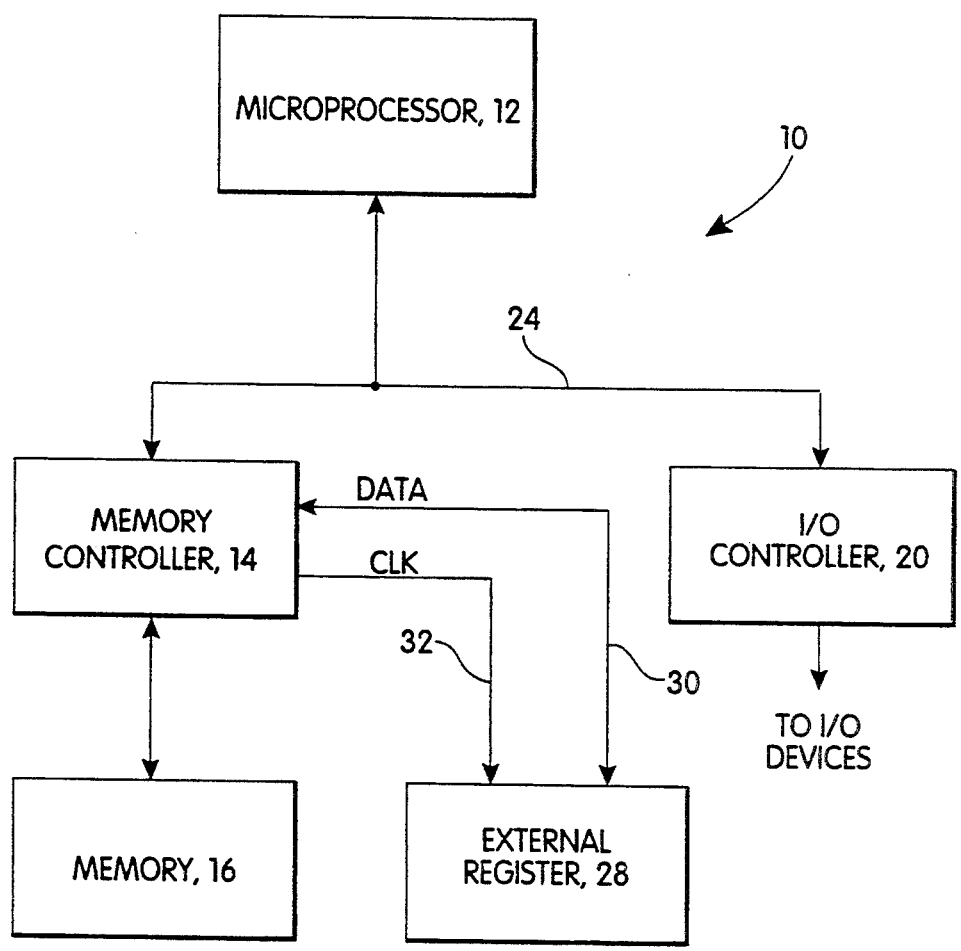
FIG. 1 is a block diagram of a computer system that incorporates the present invention.

A block diagram of a computer system incorporating the present invention is shown in FIG. 1. A computer system 10 includes a central processing unit (CPU) such as a microprocessor 12. A memory subsystem includes a memory controller 14 and a memory 16. The memory controller 14 controls access by microprocessor 12 to memory 16. The computer system 10 further includes an input output (I/O) controller 20 which controls communication with I/O devices (not shown). The microprocessor 12, the memory controller 14 and the I/O controller 20 are connected to and communicate on a bus 24.

The memory controller 14 is typically a large scale integrated circuit which receives an address from microprocessor 12 on bus 24 and provides control signals to memory 16 for reading or writing to a specified location in memory 16. As described below, the memory 16 provides presence detect bits to an external register 28. The presence detect bits are input to memory controller 14 on a data line 30 under control of a clock signal on a clock line 32.

Figure 2:
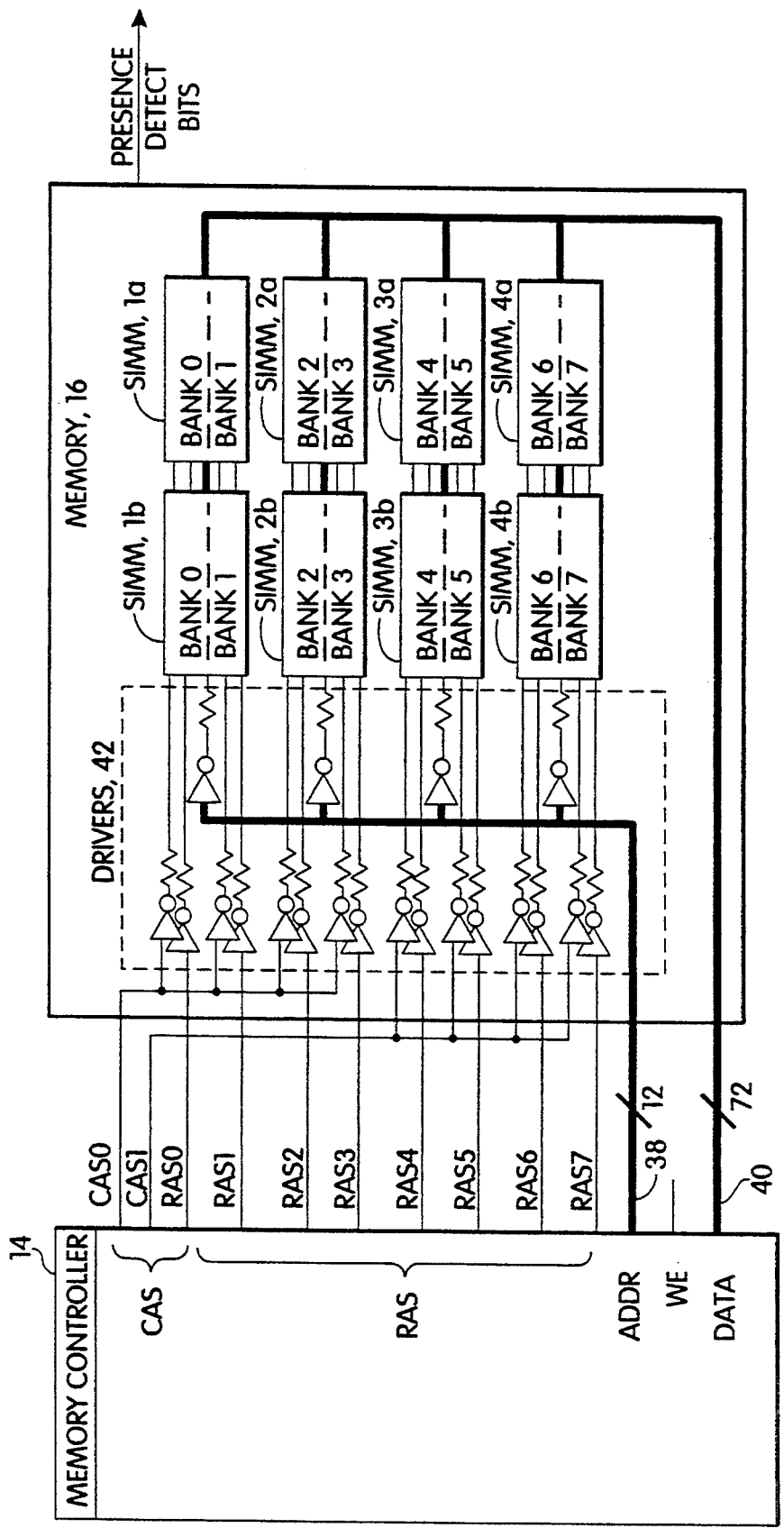
FIG. 2 is a block diagram of the memory subsystem shown in FIG. 1.

The memory subsystem is shown in more detail in FIG. 2. An address bus 38 carries addresses from the memory controller 14 to the memory 16, and a data bus 40 carries data between memory 16 and memory controller 14. The memory controller 14 provides control signals to the memory 16. In particular, column address strobe (CAS) signals CAS0 and CAS1, and row address strobe (RAS) signals RAS0, RAS1, RAS2, RAS3, RAS4, RAS5, RAS6 and RAS 7 are generated by memory controller 14. The CAS0 and CAS1 signals are used to strobe column addresses into the dynamic random access memory (DRAM) chips of memory 16. Similarly, the RAS0-RAS7 signals are used to strobe row addresses into the DRAM chips of memory 16. Before a location in memory 16 can be accessed, its column address and row address must be strobed into the DRAM chips using the CAS and RAS signals. A write enable (WE) signal is provided by the memory controller 14 to enable data to be written to the DRAM chips of memory 16.

Memory 16 includes drivers 42 that receive and drive the CAS0 and CAS1 signals, the RAS0-RAS7 signals and the addresses on address bus 38. In the present example, the memory 16 includes 8 slots, or connectors, in which memory modules can be installed. Each slot may hold a single memory module. The user of the computer system 10 configures the system as required for a particular application by installing memory modules in the slots. In the example of FIG. 2, each of the 8 slots is loaded with a single in-line memory module (SIMM). SIMMs are industry standard memory modules. In a preferred embodiment, the memory 16 operates with X36 ECC SIMMs. Slot 0 is loaded with SIMM 1a; slot 1 is loaded with SIMM 1b; slot 2 is loaded with SIMM 2a; slot 3 is located with SIMM 2b; slot 4 is loaded with SIMM 3a; slot 5 is loaded with SIMM 3b; slot 6 is loaded with SIMM 4a; and slot 7 is loaded with SIMM 4b. The SIMMs typically have a 36 bit data output. In the present example, the data width is 72 bits, and the SIMMs are addressed in pairs 1a and 1b, 2a and 2b, 3a and 3b, and 4a and 4b. The SIMMs of each pair (such as SIMMs 1a and 1b) are interconnected to receive the same RAS and CAS signals. The data bus 40 is connected to each pair of SIMMs such that bits 0 to 35 are connected to the first SIMM of the pair, and bits 36-72 are connected to the second SIMM in the pair.

Each SIMM may include up to 18 DRAM chips which may be 1 MBit chips, 4 MBit chips or 16 MBit chips. All the DRAM chips on a single SIMM are of the same memory capacity. Each of the paired SIMMs must include DRAM chips of the same memory capacity. Each SIMM may be fully populated or half populated. A fully populated SIMM includes 9 DRAM chips on each side (18 DRAM chips total). A half populated SIMM includes 9 DRAM chips on one side.

The DRAM chips on corresponding sides of each pair of SIMMs constitute a DRAM bank. For example, the DRAM chips on one side of SIMM 1a and SIMM 1b form DRAM bank 0. The DRAM chips on the other side of SIMM 1a and SIMM 1b form DRAM bank 1. Similarly, SIMMs 2a and 2b include DRAM banks 2 and 3; SIMMs 3a and 3b include DRAM banks 4 and 5; and SIMMs 4a and 4b include DRAM banks 6 and 7.

The memory 16 outputs presence detect bits which are utilized as described below to determine a memory configuration. Each of the memory modules, or SIMMs, in the memory 16 produces 6 presence detect bits for a total of 48 bits. The 6 bits from each SIMM are encoded to indicate the memory module size and the speed of the DRAM chips.

Figure 3:
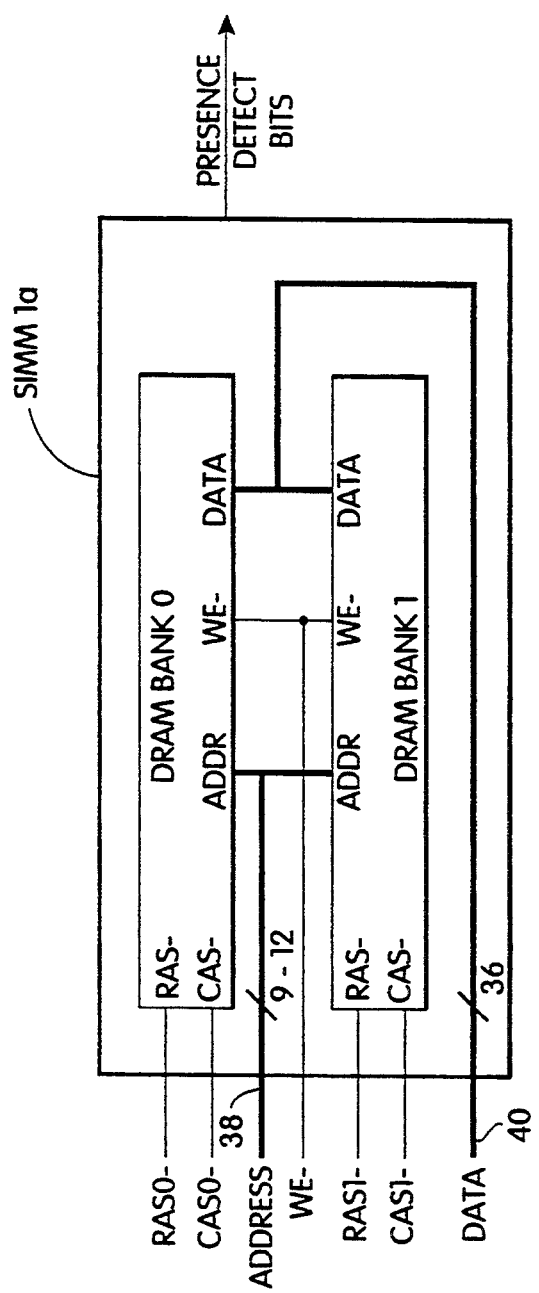
FIG. 3 is a block diagram of a memory module used in the memory subsystem.

Memory module SIMM 1a is shown in more detail in FIG. 3. The other SIMMs in memory 16 have the same construction. SIMM 1a includes DRAM bank 0 and DRAM bank 1. The data lines of DRAM banks 0 and 1 are connected to data bus 40, and the address lines of DRAM banks 0 and 1 are coupled to the address bus 38. Depending on the size of the DRAM chips on the SIMM 1a, the address bus may carry an address having 9 to 12 bits. DRAM bank 0 receives the RAS0 signal and the CAS0 signal. DRAM bank 1 receives the RAS1 signal and the CAS1 signal. The DRAM banks 0 and 1 both receive the write enable signal from memory controller 14. The SIMM 1a produces 6 presence detect bits for determining a memory configuration as described below. Techniques for generation of RAS, CAS and write enable signals, and row and column addresses for accessing the DRAM chips of the memory modules are generally known to those skilled in the art. Desirable features of a preferred memory controller are disclosed in copending applications Ser. No. 07/938,901 filed Aug. 31 1992 and Ser. No. 07/938,113 filed Aug. 31, 1992, now U.S. Pat. No. 5,278,801, which are hereby incorporated by reference.

Figure 4:
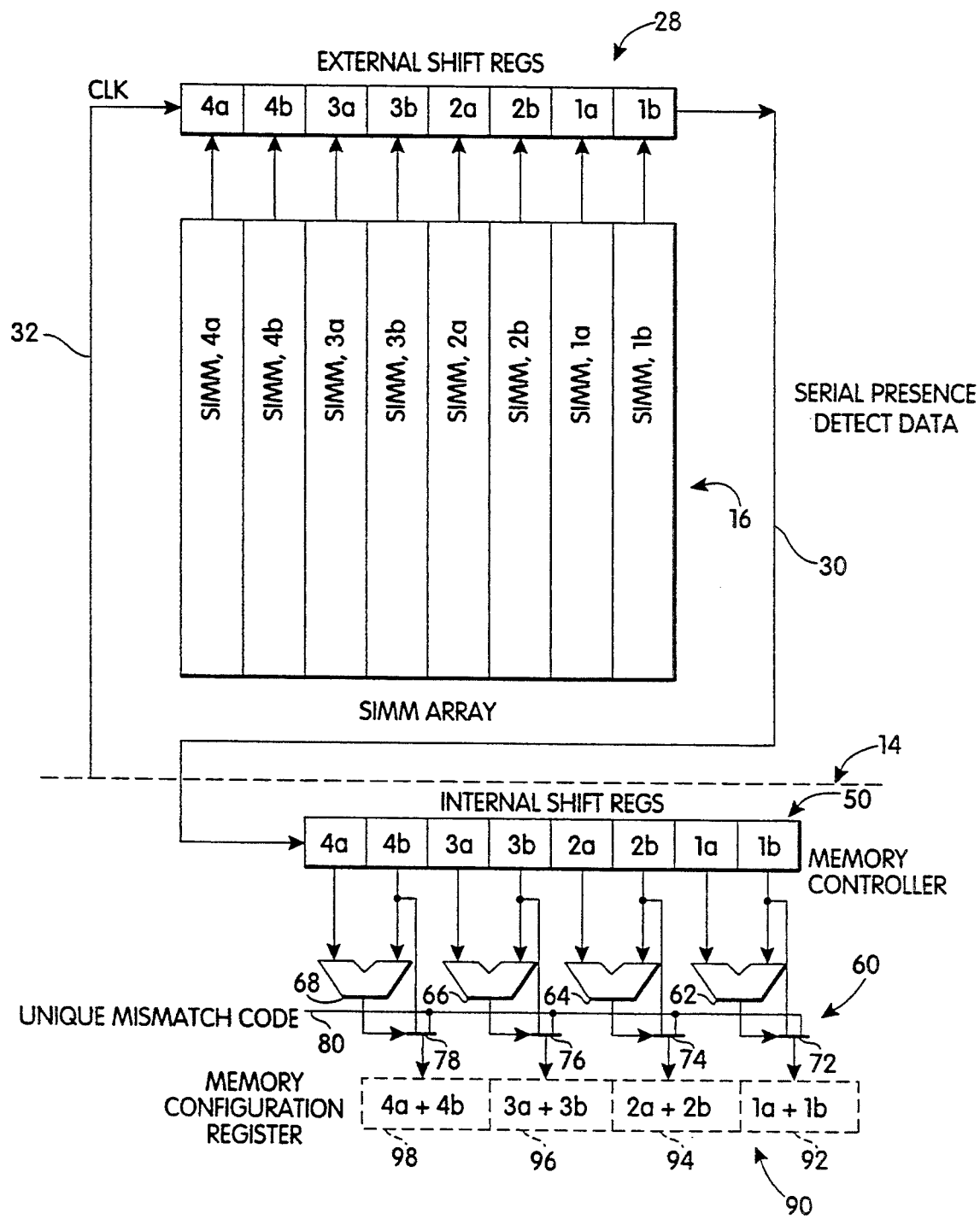
FIG. 4 is a block diagram of apparatus for determining a memory configuration in accordance with the present invention.

A block diagram of apparatus for determining a memory configuration in accordance with the present invention is shown in FIG. 4. The SIMMs 1a, 1b, 2a, 2b, 3a, 3b, 4a and 4b supply presence detect bits in parallel to external shift register 28. The external register 28 has sufficient capacity to store the presence detect bits for the maximum number of memory modules that may be installed in the computer system. In the present example, the system can accept up to 8 SIMMs, each of which produces 6 presence detect bits. Thus, the external register 28 has a capacity of 48 bits. The external register 28 is preferably mounted on the same circuit board as the memory modules.

Further in accordance with the invention, the memory controller 14, implemented as a large scale integrated circuit, contains an internal shift register 50. The internal register 50 preferably has the same capacity as external register 28. A clock signal generated by memory controller 14 is carried on the clock line 32 to external register 28. After the presence detect bits have been loaded in parallel from the memory modules into shift register 28, the clock signal is used to serially transfer the data from external register 28 to internal register 50 on the serial data line 30. Thus, the 48 bits of presence detect data are transferred into internal register 50 within memory controller 14 using a single clock line 32 and a single data line 30.

The presence detect data contained in internal register 50 is processed by logic circuitry 60 within the memory controller 14 to determine a memory configuration. In particular, the presence detect bits for pairs of memory modules are compared to determine whether the presence detect bits match. As discussed above, the memory modules are paired in order to obtain the desired memory data bus width. The memory modules of a pair are typically located adjacent to each other, but are not required to be located adjacent to each other. The memory modules of a pair must be identical. In particular, the presence detect bits of SIMMs 1a and 1b are compared by a comparator 62; the presence detect bits of SIMMs 2a and 2b are compared by a comparator 64; the presence detect bits of SIMMs 3a and 3b are compared by a comparator 66; and the presence detect bits of SIMMs 4a and 4b are compared by a comparator 68. The comparators 62, 64, 66 and 68 produce a match signal or a mismatch signal depending on the respective presence detect bits.

The outputs of comparators 62, 64, 66 and 68 are supplied to the select inputs of data selectors 72, 74, 76 and 78, respectively. The presence detect bits of SIMM 1b are supplied to one input of data selector 72; the presence detect bits of SIMM 2b are supplied to one input of data selector 74; the presence detect bits of SIMM 3b are supplied to one input of data selector 76; and the presence detect bits of SIMM 4b are supplied to one input of data selector 78. The presence detect bits for either memory module of each pair can be input to the respective data selector, since this input is selected only when the presence detect bits of the memory modules of the pair match. It will be understood that each input and each output of comparators 62, 64, 66 and 68 and data selectors 72, 74, 76 and 78 is six bits wide in the present example.

A mismatch code is supplied on a line 80 to the second inputs of each of the data selectors 72, 74, 76 and 78. The mismatch code can be any bit combination that does not match a combination of presence detect bits and which is recognized by the memory controller circuitry and the system software as indicative of a mismatch between the memory modules of a pair. The inputs to data selectors 72, 74, 76 and 78 are connected such that when the respective comparator output indicates a mismatch between the presence detect bits of a pair of memory modules, the mismatch code is output by the data selector. When the output of the respective comparator indicates a match between presence detect bits, the presence detect bits for the pair of memory modules are output by the data selector.

The outputs of data selectors 72, 74, 76 and 78 are loaded into a memory configuration register 90. The memory configuration register 90 includes a section for storing memory configuration information representative of each pair of memory modules. Thus, a register section 92 contains memory configuration information for SIMMs 1a and 1b; a register section 94 contains memory configuration information for SIMMs 2a and 2b; a register section 96 contains memory configuration information for SIMMs 3a and 3b; and a register section 98 contains memory configuration information for SIMMs 4a and 4b. When the memory modules of a pair match, the register section is loaded with the presence detect bits for the pair of memory modules. When the memory modules of a pair do not match, the register section is loaded with the mismatch code. Because the presence detect bits for the memory modules of a pair must be identical for proper operation, the capacity of memory configuration register 90 is one half the capacity of internal register 50 and external register 28. Thus, for the example where external register 28 and internal register 50 have a capacity of 48 bits each, the memory configuration register 90 has a capacity of only 24 bits. As a result, the memory configuration data which is supplied to the microprocessor 12 has a lower number of bits, thereby saving space in the address map.

In operation, the presence detect bits from all the memory modules are loaded in parallel into the external register 28 at system reset. After the memory controller 14 comes out of reset, it begins to serially clock data out of the external register 28 into the internal register 50. As indicated above, this arrangement requires only two I/O pins on the memory controller 14 which are dedicated to obtaining the presence detect bits.

The memory configuration register 90 presents a single presence detect code representing a pair of memory modules to the system software when the presence detect bits from the memory modules of the pair are identical. When the presence detect bits do not match, the mismatch code is loaded into the register 90 and is presented to the system software. When the system software reads the register 90 and finds the mismatch code, the mismatch is signalled to the user. The disclosed technique requires only one code to be provided to the software for each pair of memory modules and also ensures that the two SIMMs of each pair are identical.

The present invention reduces the cost of the memory controller integrated circuit by reducing to two the number of I/O pins that is required for determining memory configuration. Another advantage is that the hardware detects memory module mismatches in paired memory systems. This provides a faster and more concise way of reporting memory configuration information to the system software.

While there have been shown and described what are at present considered the preferred embodiments of the present invention, it will be obvious to those skilled in the art that various changes and modifications may be made therein without departing from the scope of the invention as defined by the appended claims.

What is claimed is:

1. Apparatus for determining a memory configuration of memory modules for use in controlling said memory modules, each of said memory modules producing presence detect bits, comprising:
- an external register for receiving said presence detect bits from each of said memory modules in parallel and for storing said presence detect bits, said presence detect bits including encoded bits representative of memory module capacity and memory module speed;
- a memory controller integrated circuit for controlling said memory modules, said external register being located external to said memory controller integrated circuit, said memory controller integrated circuit including an internal register for storing said presence detect bits;
- means for serially transferring said presence detect bits from said external register to said internal register; and
- logic means within said memory controller integrated circuit for determining a memory configuration in response to said presence detect bits.

2. Apparatus as defined in claim 1 wherein said means for serially transferring said presence detect bits includes a single data line and a single clock line on said memory controller integrated circuit.

3. Apparatus as defined in claim 1 wherein said memory modules are configured as memory module pairs and wherein said logic means comprises a memory configuration register, comparison means for comparing the presence detect bits of said memory module pairs and selector means responsive to said comparison means for loading the presence detect bits of one memory module of said memory module pairs into said memory configuration register when said comparison means indicates that the presence detect bits of said memory module pairs match and for loading a predefined mismatch code into said memory configuration register when said comparison means indicates that the presence detect bits of said memory module pairs do not match.

4. Apparatus as defined in claim 1 further including a circuit board for mounting said external register and said memory controller integrated circuit.

5. Apparatus as defined in claim 3 wherein said comparison means includes a comparator for each pair of memory modules and said selector means includes a data selector for each pair of memory modules.

6. Apparatus as defined in claim 5 wherein said memory configuration register includes means for storing said presence detect bits or said mismatch code for each pair of memory modules.

7. Apparatus for determining a memory configuration of one or more pairs of memory modules for use in controlling said memory modules, each memory module producing presence detect bits, comprising:
- a register for receiving presence detect bits produced by each of said memory modules and for storing said presence detect bits, said presence detect bits including encoded bits representative of memory module capacity and memory module speed;
- a memory configuration register;
- comparison means for comparing the presence detect bits of each pair of memory modules and generating a match signal or a mismatch signal for each pair of memory modules, said match signal indicating a match between the presence detect bits of a corresponding pair of memory modules and said mismatch signal indicating a mismatch between the presence detect bits of the corresponding pair of memory modules; and
- selector means responsive to said match signal for loading the presence detect bits of one memory module of the corresponding pair of memory modules into said memory configuration register and responsive to said mismatch signal for loading a predefined mismatch code into said memory configuration register.

8. Apparatus as defined in claim 7 wherein said comparison means includes a comparator for each pair of memory modules, said comparator generating a match signal or a mismatch signal.

9. Apparatus as defined in claim 8 wherein said selector means includes a data selector responsive to the match signal or the mismatch signal for each pair of memory modules.

10. Apparatus as defined in claim 7 further including a memory controller integrated circuit for controlling said memory modules, said register, said memory configuration register, said comparison means and said selector means being located within said memory controller integrated circuit.

11. Apparatus as defined in claim 10 further including means for serially transferring said presence detect bits into said register using a single data line and a single clock line on said memory controller integrated circuit.

12. Apparatus for determining a computer memory configuration, comprising:
- a circuit board;
- one or more pairs of memory modules mounted on said circuit board, each of said memory modules producing presence detect bits, said presence detect bits including encoded bits representative of memory module capacity and memory module speed;
- an external register mounted on said circuit board for receiving said presence detect bits from each of said memory modules in parallel and for storing said presence detect bits;
- a memory controller integrated circuit mounted on said circuit board for controlling said memory modules, said external register being located external to said memory controller integrated circuit, said memory controller integrated circuit including an internal register for storing said presence detect bits and logic means for determining a memory configuration in response to said presence detect bits, said memory modules being controlled by said memory controller integrated circuit in response to said memory configuration; and
- means for serially transferring said presence detect bits from said external register to said internal register.

13. Apparatus as defined in claim 12 wherein said logic means includes a memory configuration register and, for each pair of memory modules, a comparator for comparing the presence detect bits of the memory modules of the pair and generating a match signal or a mismatch signal, said match signal indicating a match between the presence detect bits of the memory modules of the pair and said mismatch signal indicating a mismatch between the presence detect bits of the memory modules of the pair, and a selector responsive to said match signal for loading the presence detect bits of one memory module of the memory modules of the pair into said memory configuration register and responsive to said mismatch signal for loading a predefined mismatch code into said memory configuration register.

14. Apparatus as defined in claim 13 wherein said memory modules comprise single in-line memory modules.

15. Apparatus as defined in claim 14 wherein said means for serially transferring said presence detect bits includes a single data line and a single clock line on said memory controller integrated circuit.

16. Apparatus as defined in claim 12 wherein said external register and said internal register each comprise a serial shift register.

* * * * *